United States Patent [19]

McIntosh

[11] 4,246,996

[45] Jan. 27, 1981

[54] SCREW OPERATED COUPLING

[75] Inventor: Arthur M. McIntosh, Arlington Heights, Ill.

[73] Assignee: Borg-Warner Corporation, Chicago, Ill.

[21] Appl. No.: 962,267

[22] Filed: Nov. 20, 1978

[51] Int. Cl.³ .............................................. F16D 19/00
[52] U.S. Cl. ........................................ 192/94; 192/35; 74/424.8 R
[58] Field of Search ......................... 192/94, 35, 85 A; 74/424.8 R

[56] References Cited

U.S. PATENT DOCUMENTS

| 813,396 | 2/1906 | Anker-Holth . | |
|---|---|---|---|
| 1,978,975 | 10/1934 | Winans . | |
| 2,504,018 | 4/1950 | Gibson et al. . | |
| 2,639,014 | 5/1953 | Munschaver ...................... | 192/85 A |
| 3,645,229 | 2/1972 | Phinney . | |
| 3,776,336 | 12/1973 | Fresard . | |

*Primary Examiner*—Kenneth Downey
*Attorney, Agent, or Firm*—Aubrey L. Burgess

[57] ABSTRACT

A remotely operable drive coupling for selectively engaging and disengaging a driving shaft and a driven shaft operable in accordance with the direction of shaft rotation. The coupling comprises a splined axially movable member connected to the driven shaft and having a screw-threaded bore, and a screw-threaded terminal part on the driving shaft adapted to be threadably received in the threaded bore when the driving shaft is rotated in one direction and the axially movable member is urged toward and in engagement with the terminal part of the driving shaft coupling the two members. Upon rotation of the driving shaft in the opposite direction, the parts become unscrewed and the axially movable part is resiliently urged away from the driving shaft uncoupling the members.

The device can be controlled hydraulically, pneumatically or electrically.

7 Claims, 5 Drawing Figures

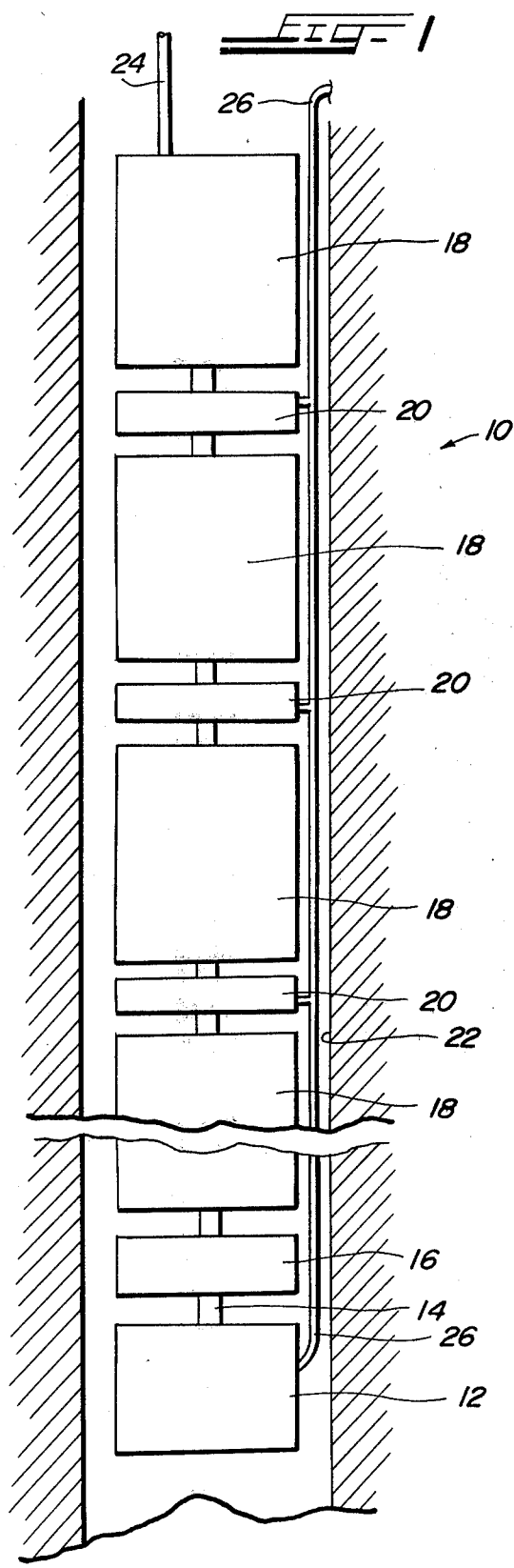

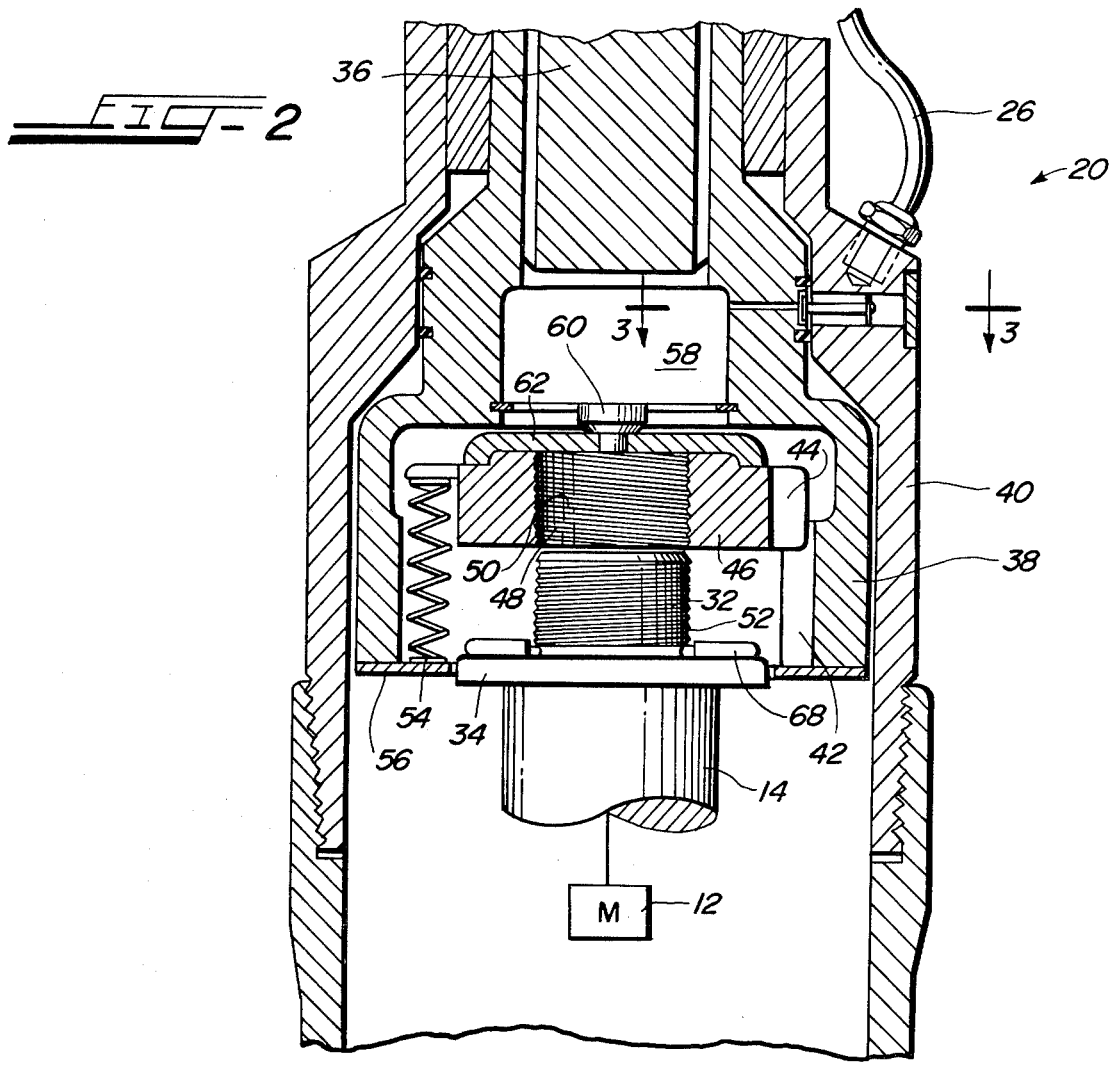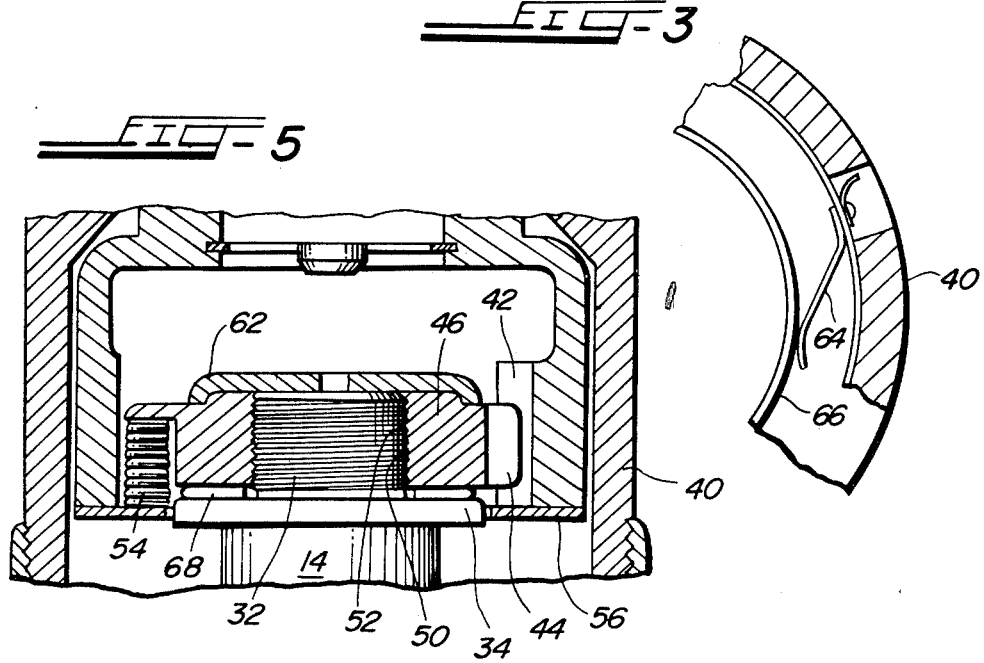

SCREW OPERATED COUPLING

BACKGROUND OF THE INVENTION

A submersible pump especially for use in deep wells, either water or oil and combinations thereof, comprises an electric motor and a plurality of pump stages, the motor being lowermost and separated from the pump stages by a seal section to substantially prevent well fluid leakage into the motor housing. At times, there are a hundred or more pump stages and the electric motor may be some thirty feet in length with a diameter of approximately six inches. In order to optimize and/or change the pumping performance, pump stages are added or subtracted from the assembly, which requires pulling the assembly from the well. This is not only time consuming and costly, but is also inconvenient and unnecessary.

This invention provides a means of adding or subtracting pump stages by remotely controlling one or more couplings strategically located in the assembly.

The coupling of this invention is not limited to underground applications but can be used in other applications where similar problems of coupling and uncoupling members occur.

THE DRAWINGS

FIG. 1 is a schematic illustration of a submersible pump assembly using this invention showing the relationship of the motor, seal, couplings and pump stages in a well;

FIG. 2 is an axial sectional view through an apparatus of this invention showing an electrical system for activation of the coupling;

FIG. 3 is a sectional view of the apparatus of FIG. 2 taken on line 3—3 of FIG. 2;

FIG. 5 is a partial sectional view of the coupling engaged.

THE INVENTION

Figure 4:
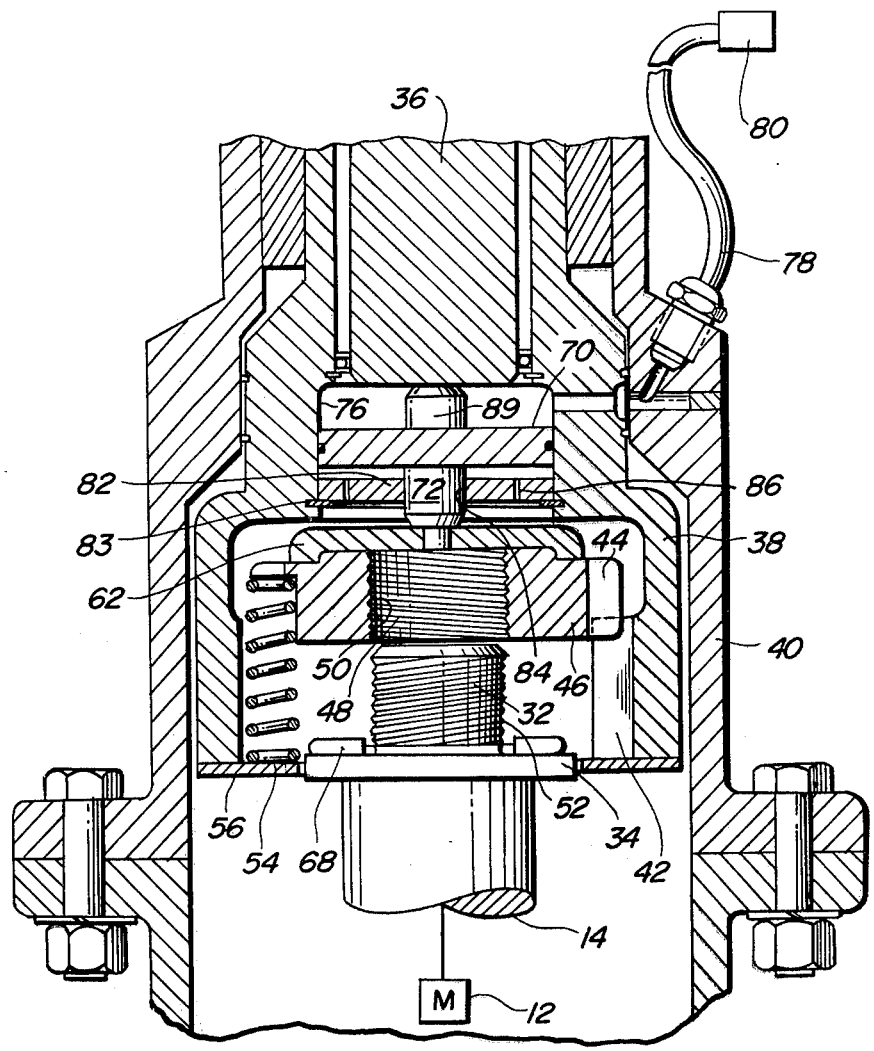
FIG. 4 is a sectional view similar to FIG. 2 showing a pressure system for activation of the coupling.

A coupling which is especially adaptable but not limited to use in a submersible pump assembly for sequentially connecting and disconnecting a driving shaft and a driven shaft depending upon the direction of rotation of the driving shaft which can be remotely operated is herein described.

Pump stages are removed or added to optimize or modify the pump performance without pulling the entire system from the well.

The coupling comprises a splined axially movable member having a threaded bore and connected to the driven shaft and a threaded terminal end on the driving shaft, the threaded end being adapted to mate with the threads of the bore to couple the shafts. Remotely operable means which can be electrical, hydraulic or pneumatic and combinations thereof are provided to move the axially movable member into a position where the threads begin to engage when the driving shaft is rotating in one direction. Resilient means and/or thread "ratcheting" are effective to cause uncoupling of the shafts when the driving shaft is rotating in the opposite direction.

DETAILED DESCRIPTION

Attention is now invited to FIG. 1 of the drawings which illustrates schematically a submersible pump assembly 10 constructed in accordance with this invention and which comprises an electric motor 12 having a driving shaft 14, a seal section 16 of usual construction through which passes the shaft 14 or an extension thereof, and a plurality of pump stages 18 alternating with coupling-uncoupling devices 20. Each pump stage 18 may comprise a plurality of alternate impellers and diffusers as known in the art. The pump (the total of the stages) pumps fluid from a well casing 22 into which the assembly 10 is lowered and discharges the well fluid from an outlet 24. One or more conduits 26 supplies electric current to the motor 14. The location of this invention permits selective uncoupling and coupling of pump stages to optimize and/or change the performance of the assembly. In the embodiments described, the same reference number is used to refer to the same part.

The embodiment of the coupling-uncoupling device 20 illustrated in FIGS. 2 and 3 comprises the driving shaft 14 provided with a screw-threaded end 32 and a shaft collar 34. The device 20 also comprises a pump or driven shaft 36 attached to a generally cylindrical end or bell-shaped part 38 encased in a housing 40 which also surrounds the shaft 14 and the end thereof. The part 38 has internal splines 42 which register with external splines 44 on an axially movable nut 46. The splined construction permits axial movement of the nut 46 and provides a guide for such movement. The nut 46 has a centrally located threaded bore 48, the threads 50 of which mate with the pitch of the threads 52 of the drive shaft end 32.

Three coil springs 54 positioned between a bottom retainer 56 connected to the end 38 and the nut 46 resiliently urge the latter upwardly, as viewed in the drawings to uncouple the nut 46 and associated parts as will be explained.

To move the nut 46 downwardly against the force of the springs 54, alternative constructions, as illustrated in the drawings, can be used.

The construction of FIGS. 2 and 3 provides an electric actuation of the nut 46 and comprises a solenoid 58 having a plunger 60 acting through thrust cover member 62 which is part of the top of the nut 46. The power is supplied to the solenoid by the conduit protected electric cable 26 through properly insulated contact spring 64 and a slip ring 66 (see especially FIG. 3). As will be readily understood, by actuating the solenoid, the plunger will move downwardly a short distance and contact the nut 46 wherein the internal threads 50 of the nut engage the threads 52 of the end of the rotating driving shaft 14. Once the threads are engaged, the coupling will be completed within a short time by motor rotation. In order to eliminate binding and the like, a thrust bearing 68 is provided on the shaft collar 34 for engagement by the nut 46. As an alternative, the contact spring 64 can be replaced by a brush of usual construction.

The arrangement illustrated in FIG. 4 provides a pressure actuation of the nut member 46 either pneumatically or hydraulically and combinations thereof. A piston 70 having an attached plunger 72 is provided and contacts the thrust cover 62 of the nut 46. The piston 70 is received in a properly sealed cylinder 76 formed in the part 38. Suitable ducts 78 bundled with the cable 26 are connected to a pressure source 80.

The pneumatic or hydraulic pressure actuates the piston 70, moving it a sufficient distance whereby the threads 52 of the driving shaft 14 and the threads 50 on the nut 46 engage to couple the shafts 14 and 36. A cylinder cover 82 located in the cylinder 76 by a snap ring 83 with a central opening 84 for the plunger 72 provides a guide for the plunger; the cylinder 76 is vented at one end via vents 86 in the cover 82. A stop 89 limits the upward piston movement and prevents blocking of the feed passages.

In either embodiment shown, upon rapidly reversing the direction of rotation of the stopped driving shaft, the inertia and drag of the various parts associated with the driven shaft 36 will cause the nut 46 to be unscrewed. The springs 54 urge the nut 46 to move upwardly to a location where it is spaced from the driving shaft 14 and the shafts are uncoupled. To then couple the shafts, the solenoid 58 is energized or pneumatic or hydraulic fluid at sufficient pressure is supplied to the piston cylinder 76 moving the plunger 60 or 72 downwardly to mate the threads 50 and 52. Coupling is made only when the driving shaft rotation is in the proper direction.

I claim:

1. In apparatus for drivingly connecting a driving shaft and a driven shaft, the improvement which comprises:
   coupling means comprising: axially movable means drivingly connected to said driven shaft and having a threaded bore and a threaded member connected to said driving shaft adapted to be receivable in said threaded bore, said axially movable means and said threaded member being operable to drivingly connect said shafts when said driving shaft is rotated in one direction to thereby engage said threaded member and said bore and to uncouple said shafts when said driving shaft is rotated in the opposite direction to thereby disengage said threaded member and said bore, and means to move said axially movable means into coupling position.

2. In a coupling device for connecting a driving shaft and a driven shaft when the driving shaft is rotated in one direction and permitting uncoupling when the driving shaft is rotated in the opposite direction, the improvement which comprises:
   a screw-threaded terminus on said driving shaft;
   an axially movable member operatively associated with said driven shaft having a mating threaded bore for said threaded terminus;
   means connected to said driven shaft permitting axial movement of said axially movable member while providing a connection for said member and said driven shaft;
   means for axially moving said axially movable member toward said driving shaft such that said bore and said threaded terminus mate to drivingly connect said shafts when said driving shaft is rotating in one direction; and
   means urging said axially movable member away from said driving shaft when said driving shaft is rotating in the opposite direction.

3. In a coupling device as recited in claim 2 wherein said means to move said axially movable means into coupling position comprises a solenoid and means to energize said solenoid.

4. In a coupling device as recited in claim 2 wherein said means to move said axially movable means into coupling position comprises a piston movable in a cylinder and means to supply fluid pressure to said cylinder to move said piston.

5. In a coupling device as recited in claim 2 wherein said means urging said axially movable member away from said driving shaft comprises spring means.

6. In a coupling device as recited in claim 2 further comprising means operatively associated with said driven shaft for guiding the axial movement of said axially movable member and preventing relative rotation between said axially movable member and said driven shaft.

7. In a coupling device as recited in claim 6 wherein said operatively associated means comprises splines on said axially movable member and on a portion of said driven shaft.

* * * * *